UNITED STATES PATENT OFFICE.

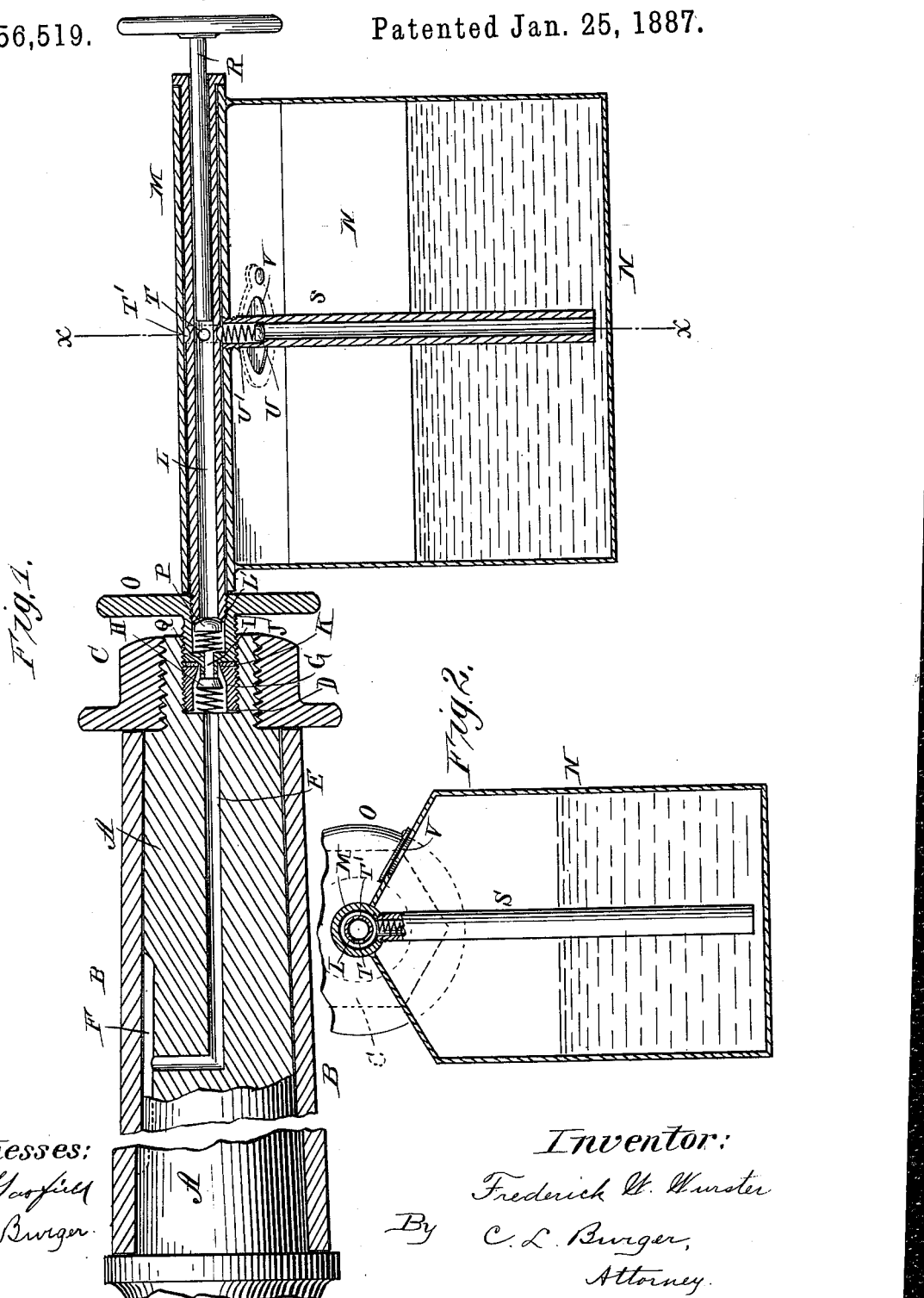

FREDERICK W. WURSTER, OF BROOKLYN, NEW YORK.

AXLE-LUBRICATOR.

SPECIFICATION forming part of Letters Patent No. 356,519, dated January 25, 1887.

Application filed October 27, 1886. Serial No. 217,324. (No model.)

*To all whom it may concern:*

Be it known that I, FREDERICK W. WURSTER, of Brooklyn, in the county of Kings and State of New York, have invented a new and Improved Axle-Lubricator, of which the following is a full, clear, and exact description.

My invention relates to that class of axle-lubricators in which the axle is provided with a valve-chamber connected by a suitable oil-duct with the interior of the axle-box, the self-acting valve in said chamber opening inwardly and being adapted to be pushed inward by the nozzle of an oil pump or injector in oil-tight connection with the valve-chamber.

The object of the invention is to so arrange the valve-chamber in relation to the axle that said chamber will be at all times in absolutely oil-tight connection with the interior of the axle-box, and that the injector-nozzle may be quickly placed in a similarly-tight connection with the valve-chamber without necessitating the employment of an independent coupling device.

To this end the invention consists, principally, in locating the chamber with its valve, as above described, in a recess formed in the outer end of the axle-spindle, the recess being connected by an oil-duct with the axle-box interior.

The invention also consists in forming said valve-containing recess at its outer end with an internal thread, adapted to engage an external thread formed on the discharge-nozzle of the oil pump or injector, or on a suitable coupling-sleeve carried by said nozzle.

The invention finally consists in the combination, with the internally-threaded valve-containing recess, of an oil pump or injector provided with an externally-threaded nozzle mounted to turn loosely on the pump-reservoir, whereby the pump-barrel can be connected directly with the valve-containing recess without the use of any independent coupling device, as before stated.

Reference is to be had to the accompanying drawings, forming part of this specification, in which similar letters of reference indicate corresponding parts in both the figures.

Figure 1 is a longitudinal section of an axle and attached oil-pump having my improvements applied thereto, and Fig. 2 is a cross-sectional view on the line $xx$, Fig. 1.

A is the axle-spindle, B the axle-box, and C the axle-nut, all of the usual description.

In carrying out my invention, I form in the extreme outer end of the axle-spindle A, by boring or otherwise, a central tubular recess, D, which is connected by a centrally-drilled oil duct or passage, E, and its branch duct, with the usual shallow groove, F, in the surface of the spindle. The end recess, D, is preferably formed with an internal thread to engage an external thread formed on the valve box or chamber G, which may be screwed to its seat in said recess by means of a screw-driver inserted in a transverse slot (not shown) in its outer end; or the recess D may be made slightly tapering and the smooth-faced valve-box driven directly to its seat therein.

The valve box or chamber G may be of the usual description, carrying a spring-pressed conical valve, H, fitted to a corresponding seat in the valve-box, and adapted to be pushed inward and opened by a perforated and notched nib, I, on the pump or injector nozzle J, entering the supply-orifice in said valve-box. The outer part of the spindle-recess G is also internally threaded to engage the external thread on the pump-nozzle J, which when the axle is to be oiled is screwed into said recess against the end of the valve box or chamber G, packing K, of suitable material, being preferably carried by the end of the nozzle J to render the joint oil-tight.

In order that the nozzle or discharge end J of the pump-barrel L may be easily rotated for screwing it into the valve-containing recess G in the axle-spindle, I mount said barrel L, with which the nozzle J may be integrally formed, or to which it may be rigidly attached, as hereinafter described, to turn loosely in a tube or cylinder, M, soldered or otherwise secured lengthwise along the top of the pump-reservoir N, or formed integrally therewith, the nozzle being provided with a milled hand-disk, O, for turning it.

For convenience of construction, I form the hand-disk O' integrally with the nozzle J, which is made of a somewhat larger diameter than the rest of the pump-barrel L, and is screwed rigidly thereon, the end of the barrel proper forming an annular shoulder or seat, L', for the valve P, which opens outward, its closing-spring bearing against the annular shoulder Q, carrying the perforated nib I. The nozzle J may, however, be formed integrally with the body of the barrel L, if desired, the shoulder L' being turned or otherwise formed therein. The forward end of the barrel-containing tube or cylinder M projects somewhat beyond the end of the pump-reservoir N, in order to allow room for turning the hand-disk O.

In the rear part of the pump or injector barrel L is fitted and works the piston or plunger R, provided with a suitable handle for operating it. Connection between the pump-barrel L and the oil in the reservoir N is established by means of a vertical tube, S, screwed into the under side of the barrel-holding cylinder M, and an inlet-orifice, T, formed in the barrel and adapted to register with the end of the supply-tube S, an annular groove, T', being cut around the barrel in line with said tube S, so that however the barrel is turned connection is made between the supply-tube S and the inlet-orifice T.

In the upper end of the tube S is held an upwardly-opening valve, U, held upon its seat in said tube by a coiled spring, U'.

The pump-reservoir N is provided with a slide-covered opening, V, through which the oil is introduced for filling the reservoir.
When the axle is to be oiled, the pump-nozzle is connected with the valve-chamber G, as above described, and the plunger R operated in the usual manner, when the oil will be forced through the several oil-passages in the axle-spindle into the interior of the axle-box, thoroughly lubricating the same.

Heretofore the valve-chamber G has been attached to the axle-nut and an oil-duct drilled through the nut and the axle-spindle. With this arrangement the oil forced into the valve-chamber under pressure was almost certain to escape between the nut and the axle and box, while an independent coupling device was necessitated for connecting the pump-nozzle with the oil-chamber.

In my improved construction the oil-chamber is placed in direct oil-tight connection with the interior of the axle-box; and, further, the use of an independent coupling device for the pump-nozzle is rendered unnecessary, the said nozzle being screwed directly into the valve-containing recess in the axle-spindle, so that multiplicity of external connections is avoided.

Having thus described my invention, I claim as new and desire to secure by Letters Patent—

1. The combination, with the axle spindle and box, the spindle being formed in its outer end with a recess connected by an oil-passage with the interior of the axle-box, of a valve box or chamber in said recess, a self-closing valve in said valve box or chamber opening inward, and an oil pump or injector arranged to be placed in oil-tight connection with said valve-chamber, and provided with a discharge-nozzle adapted to push said valve inward, substantially as shown and described.

2. The combination, with the axle-spindle A, formed in its outer end with the internally-threaded recess D, and the axle-box B, having its interior connected by an oil-duct with the recess D, of a valve box or chamber in said recess D, an inwardly-opening valve in said box or chamber, and an oil pump or injector provided with an externally-threaded nozzle adapted to be screwed into said threaded recess D, substantially as herein shown and described.

3. The combination, with the axle-spindle A, formed in its outer end with the internally-threaded recess D, and the axle-box B, having its interior connected with said recess D by an oil-duct, F, of a valve in said recess opening inward, and an oil pump or injector provided with an externally-threaded nozzle adapted to be screwed into said recess D, said nozzle being mounted to turn freely on the oil-pump reservoir, substantially as specified.

F. W. WURSTER.

Witnesses:
WILLIAM O. FITCH,
C. L. BURGER.